United States Patent

[11] 3,579,957

| [72] | Inventors | James Claiborne Mills, Jr.<br>Chesterfield County;<br>Gordon W. Hays, Richmond, Va. |
|---|---|---|
| [21] | Appl. No. | 706,435 |
| [22] | Filed | Feb. 19, 1968 |
| [45] | Patented | May 25, 1971 |
| [73] | Assignee | AMF Incorporated |
| [32] | Priority | May 3, 1967, June 7, 1967 |
| [33] | | Great Britain |
| [31] | | 10201/67 and 26296/67 |

[54] BAGGING APPARATUS
10 Claims, 13 Drawing Figs.
[52] U.S. Cl. .................................................. 53/190,
53/261
[51] Int. Cl. ..................................................... B65b 5/04
[50] Field of Search .......................................... 53/187,
188, 190, 384, 385; 198/27; 214/6 (K)

[56] References Cited
UNITED STATES PATENTS

| 3,451,192 | 6/1969 | Irwin | 53/190 |
| 3,366,253 | 1/1968 | Walchhuter | 214/6K |
| 512,377 | 1/1894 | Hooper | 198/27 |
| 3,421,287 | 1/1969 | Sheets | 53/384X |
| 3,130,839 | 4/1964 | Grasvoll | 214/6K |
| 3,432,045 | 3/1969 | Bauer | 214/6K |

*Primary Examiner*—Theron E. Condon
*Assistant Examiner*—Horace M. Culver
*Attorneys*—George W. Price and Barry H. Fishkin ABSTRACT: A bagging apparatus comprising a frame, an electric drive motor mounted thereon and a power train for transmitting the power of the motor to the driven members hereinafter described. These include a flighted infeed conveyor, a bagging mechanism operable to receive articles from the infeed conveyor, pickup a bag from a supply thereof, and in conjunction with a blockade member to effect relative movement between the article supported therein and the bag to pull the bag over the article and strip the bagged article from the mechanism, a drop transfer mechanism for temporarily supporting an article at the transfer area between the forward end of the infeed conveyor and the bagging mechanism, and an elevator mechanism for receiving bagged articles stripped from the scoop-tray mechanism and transporting them to an outfeed conveyor.

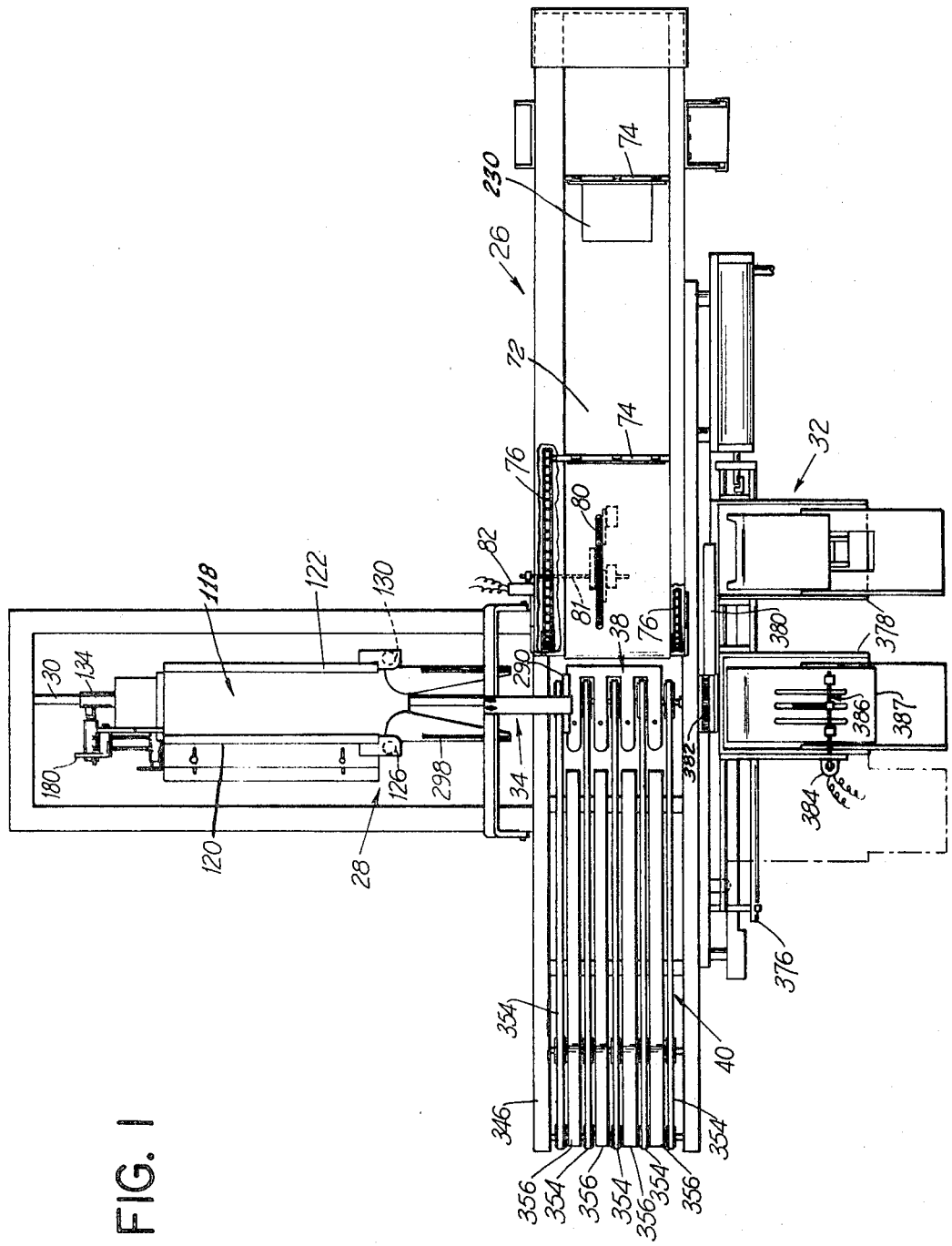
FIG. 1
INVENTORS
J. CLAIBORNE MILLS
GORDON W. HAYS
BY
ATTORNEY

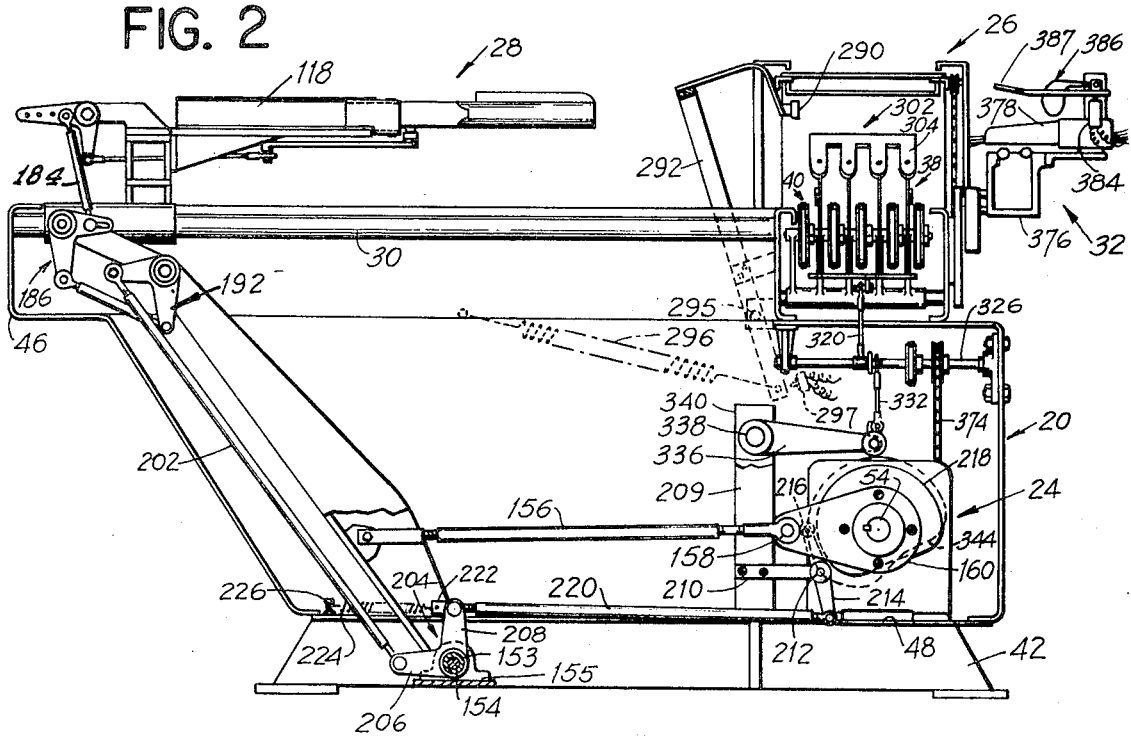
FIG. 2
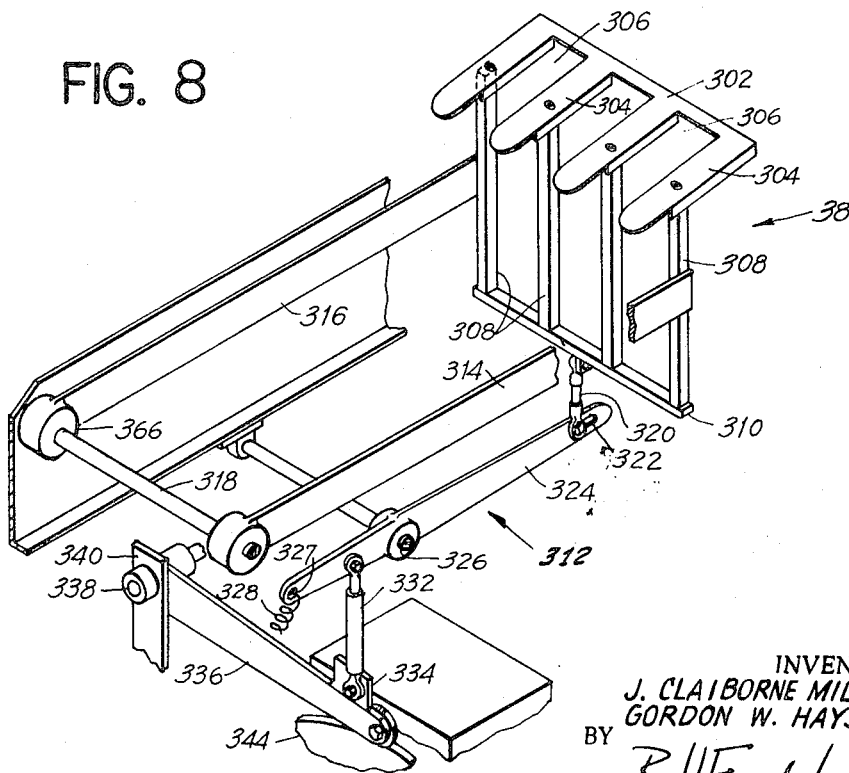
FIG. 8

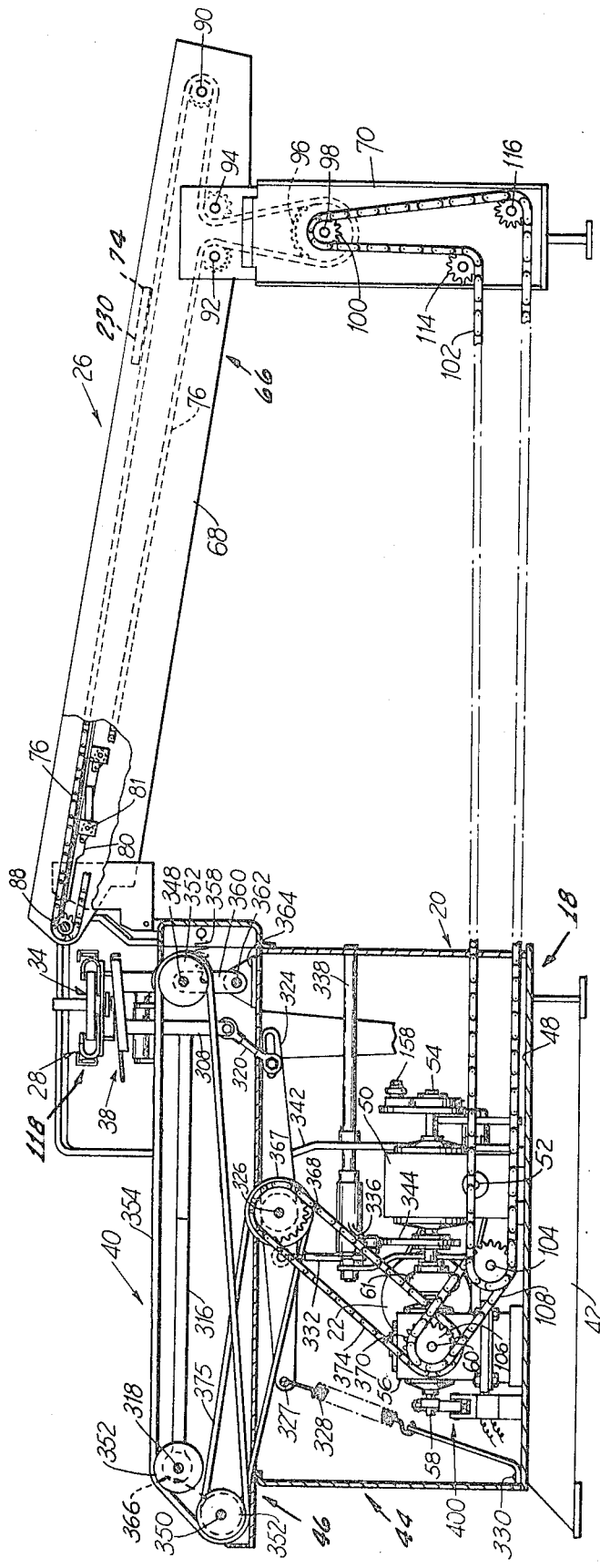

INVENTORS
J. CLAIBORNE MILLS
GORDON W. HAYS
BY
ATTORNEY

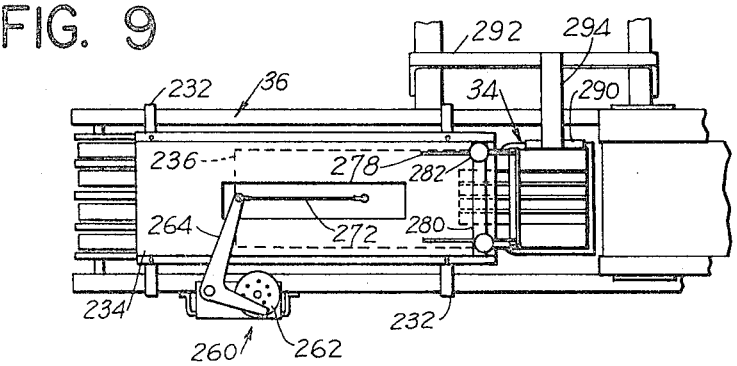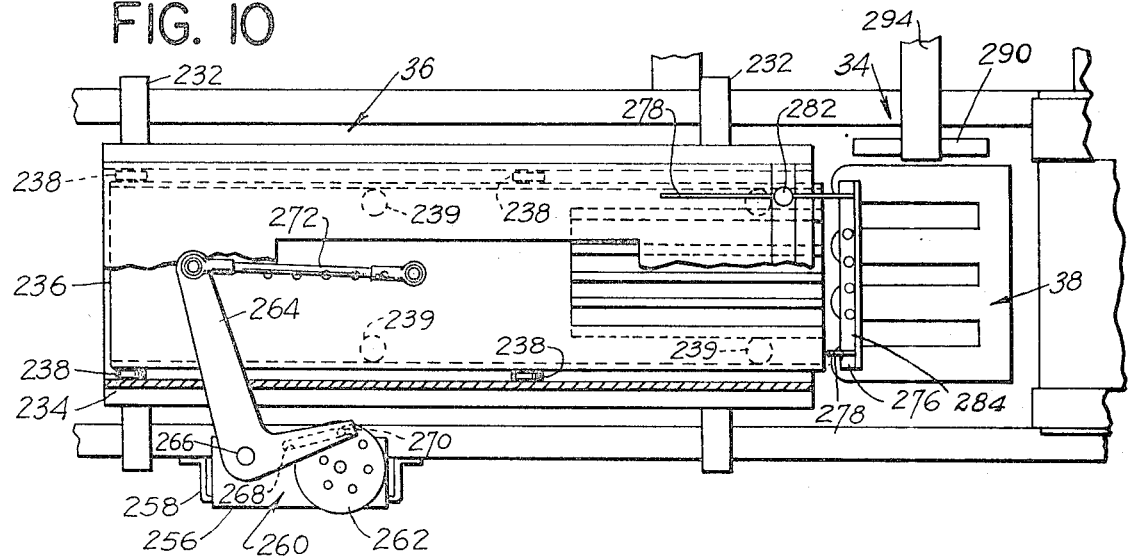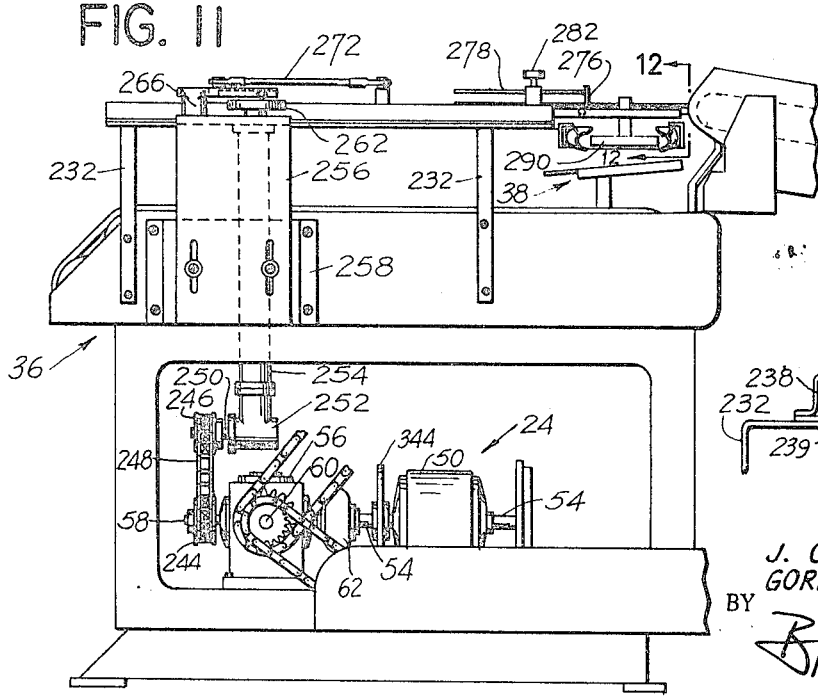

BAGGING APPARATUS

BACKGROUND

This invention relates to the packaging of goods, and more particularly to the automatic placement of soft goods, such as sheets and pillowcases into bags.

While bagging apparatus in general is old in the art, the rapid and automatic bagging of nonrigid and saggable goods has always presented difficult problems due the predilection of such goods to sag or deform at transfer points where they are unsupported. This problem is particularly acute when the articles are transferred between different vertical levels. These problems heretofore have precluded the handling of such articles in a rapid and efficient manner.

SUMMARY

It is accordingly, an object of this invention to provide apparatus for bagging saggable and nonrigid goods.

It is a further object of this invention to provide apparatus for the efficient handling of saggable and nonrigid goods at transfer points in a packaging operation.

It is a further object of this invention to provide a temporary supporting means for articles being delivered from a conveyor to an article receiving means reciprocating past the front of the conveyor and at an angle therefor.

It is a still further object of this invention to provide article transfer means for articles that are removable from a raised materials handling device and deliverable to a materials handling device at a lower level.

In accordance with these and other objects, which will be apparent from the description of the preferred embodiment hereinbelow, the invention comprises means associated with a bagging machine that includes an infeed conveyor for articles to be bagged, an outfeed conveyor for bagged articles, and a bagging mechanism mounted for reciprocal movement past the infeed conveyor whereat it is operable to receive articles from the infeed conveyor and past the outfeed conveyor whereat bagged articles are removable therefrom, which means include means for supporting and positioning an article coming off the infeed conveyor preparatory to its delivery to the bagging mechanism, and means for engaging a bagged article after its removal from the bagging mechanism and transporting it to the outfeed conveyor.

RELATION TO COPENDING APPLICATIONS

This application relates to apparatus disclosed in the assignee's copending application, Ser. No. 396,430, now U.S. Pat. No. 3,451,192 entitled "Bread Bagger," and is essentially an adaptation of that apparatus to nonrigid saggable goods. The bag supply apparatus in this application is disclosed in detail in the assignee's copending application, Ser. No. 620,387, entitled "Quick Change Supply Apparatus."

DESCRIPTION OF THE DRAWINGS

FIG. 1 is a plan view of a preferred embodiment of the invention with the scoop means thereof shown in retracted position.

FIG. 2 is a front sectional view of the apparatus shown in FIG. 1.

FIG. 3 is a side sectional view of the apparatus shown in FIG. 1.

FIG. 8 is a fragmentary enlarged view of the operating mechanism of the discharge elevator.

FIG. 9 is a fragmentary plan view of the apparatus, showing the drop-transfer mechanism in its forward position.

FIG. 10 is an enlarged fragmentary plan view of the apparatus, partially in section, showing the drop-transfer mechanism in its rearward position.

FIG. 11 is a front view of the apparatus with portions thereof broken away to show the operating mechanism for the drop-transfer mechanism.

FIG. 12 is a front view of the drop-transfer mechanism, taken along line 12—12 of FIG. 10.

DESCRIPTION OF THE PREFERRED EMBODIMENT

Figure 4:
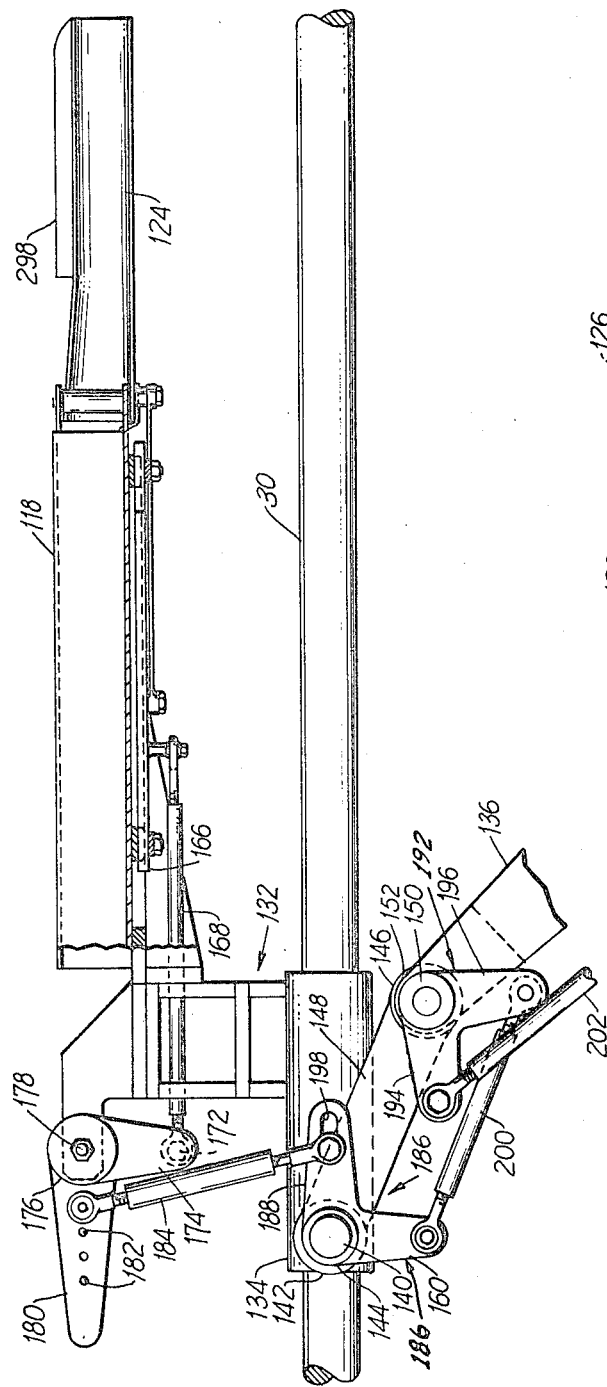
FIG. 4 is a side elevation view of the scoop-tray mechanism of the invention.

With reference to the drawings, bagging apparatus 18, according to a preferred embodiment of the invention, comprises a frame 20, an electric drive motor 22 mounted thereon and a power train generally designated 24 for transmitting the power of the motor to the driven members hereinafter described. These include a flighted infeed conveyor 26, a scoop-tray mechanism 28 for receiving articles from the infeed conveyor, the scoop-tray mechanism being mounted on a shaft 30 for reciprocal movement to and from a bag supply subcombination 32 and operable to pick up a bag from the supply, and in conjunction with blockade means 34 to effect relative movement between the article supported therein and the bag to pull the bag over the article and strip the bagged article from the mechanism, a drop transfer mechanism 36 (FIGS. 9—12) for temporarily supporting an article at the transfer area between the forward end of the infeed conveyor and the scoop-tray mechanism, and an elevator mechanism 38 for receiving bagged articles stripped from the scoop-tray mechanism and transporting them to an outfeed conveyor 40.

Referring now to FIGS. 1—3, bagging frame 20 includes a heavy foundation base 42 on which is mounted a first-story housing 44 and a second-story housing 46. A floor plate 48, which is mounted to foundation base 42, forms the floor of first-story housing 44. The elements of drive train 24 are mounted to floor plate 48 and include a heavy-duty worm-reduction-gearbox 50 having a lower input shaft 52 and an upper output shaft 54, and bevel gearbox 56 having an input shaft 58 in alignment with output shaft 54 and an output shaft 60 in the same horizontal plane and at right angles to shaft 58. Adjacent ends of shafts 54 and 58 are united by a rubber coupling 61. The above elements of power train 24 are driven by electric drive motor 22 through a drive belt 62 and a brake-clutch unit 64. The latter is electrically controlled, as will be explained later, and is in alignment with and connected to input shaft 52 of the worm reduction gearbox 50. With this arrangement, energization of drive motor 22 when the brake-clutch unit 64 is functioning to transmit rotation therethrough to input shaft 52, causes the output shafts 54 and 60, and input shaft 58 to rotate at the same speed which, of course, is considerably slower than the speed at which input shaft 52 is rotated.

Infeed conveyor 26 includes a frame 66 having inturned side channel members 68 which are supported by channel legs 70 at the article receiving end of the conveyor and by the second-story housing 46 of the bagger at the discharge end thereof. The side members 68 are united by a flat steel deck 72 over which articles to be bagged are propelled by crossbar pushers 74. Crossbar pushers are driven by spaced endless conveyor chains 76 which are recessed laterally into the side members 68 so they do not engage the articles being fed. The spacing of side members 68 is adjustable so as to provide a capability to adjust to the width of the particular articles being fed.

Figure 13:
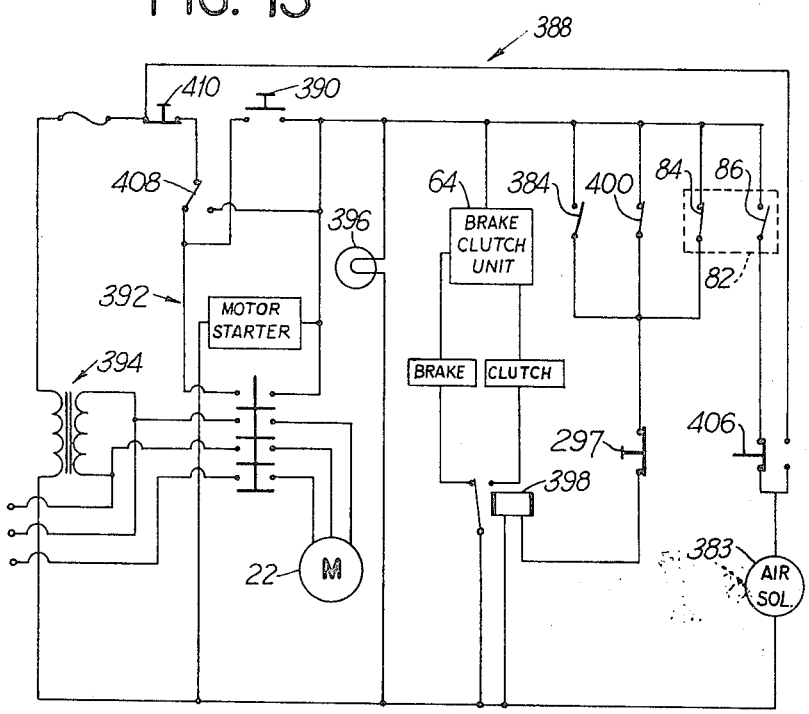
FIG. 13 is a schematic diagram of the electric system of the invention.

A switch actuating member 80 is mounted in the middle of flat deck 72 at the forward end thereof is biased upwardly by the spring in a microswitch 82 so as to extend into the path of articles being fed along said infeed conveyor 26. With this arrangement, whenever an article is pushed onto actuating member 80, microswitch 82 will be actuated. Microswitch 82 is of the double pole variety and embodies two switches 84 and 86, the first of which is normally open and the second of which is normally closed (FIG. 13).

As stated above, article pusher bars are driven by spaced endless chains 76. Chains 76 are mounted over idler sprocket gears 88, 90, 92 and 94, and driven by sprocket gear 96. Sprocket gear 96 is mounted on a shaft 98, which is driven through a sprocket gear 100 by endless chain 102, which connects to power train 24 at sprocket gear 104.

More specifically, sprocket gear 104 is driven from output shaft 60 of the bevel-gearbox 56 through a sprocket 106 and an endless chair 108. A pair of idler sprockets 114 and 116 are provided to turn endless chain 102 90° as shown in FIG. 2.

Referring now to FIGS. 2 and 4—7, scoop-tray mechanisms 28 generally includes a tray member 118 of generally rectangular shape when viewed from above. Tray member 118 includes upwardly extending sidewalls 120 and 122. A scoop member 124 is connected to the leading edge of sidewall 120 by a pivotal connection 126, and in a similar manner, an identical scoop member 128 is connected to the leading edge of sidewall 122 by a pivotal connection 130.

The scoop-tray mechanisms is mounted for reciprocal movement on shaft 30, which is mounted between opposite walls of second-story housing 46, by a carriage 132 having a slide bearing 134 which engages shaft 30 and supports carriage 132 and the scoop-tray mechanism thereon.

Carriage 132 is reciprocated along shaft 30 by a reciprocating lever 136, which is driven from power train 24. Carriage 132 is connected to reciprocating lever 136 by a mechanism that includes slide bearing 134 and a cylindrical lug 138 which extends horizontally from slide bearing 134 and includes a tapped hole for receiving a shaft 140. Shaft 140 extends into a cylindrical bearing housing 142, and is journaled therein by a bearing 144. Bearing housing 142 is connected to a like bearing housing 146 by structural members 148.

A shaft 150 is mounted in bearing housing 146 and is connected to the upper end of carriage reciprocating lever 136, which includes an eyelet-type bearing member 152 mounted around shaft 150 and within bearing housing 146.

The lower end of carriage reciprocating lever 136 (FIG. 2) is pivotally mounted by a bearing 153, which it houses, by a stationary shaft 154 which is mounted by a bracket 155 to the floor of frame 20. Lever 136 is oscillated about shaft 154 by an operating rod 156, which is connected to power train 24 by a crankpin 158 attached to a cam or crank lever 160 mounted on output shaft 54.

Figure 5:
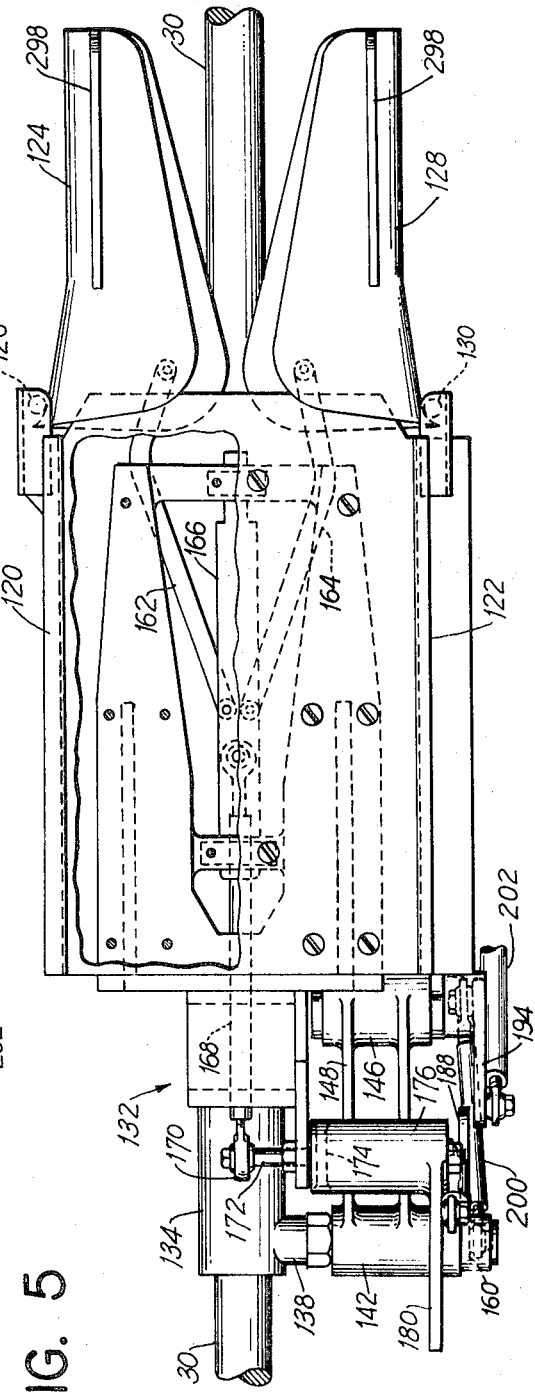
FIG. 5 is a plan view of the mechanism shown in FIG. 4.
Figure 6:
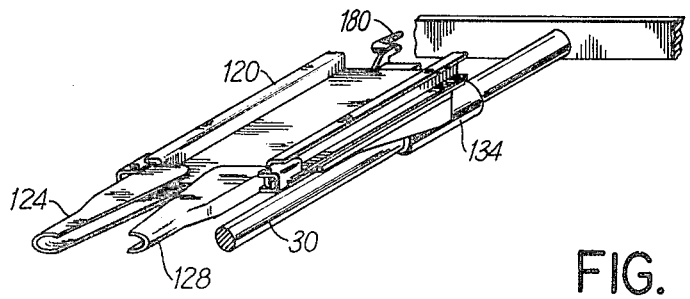
FIG. 6 is a perspective view of the mechanism shown in FIGS. 4 and 5, looking from the top front of the apparatus.
Figure 7:
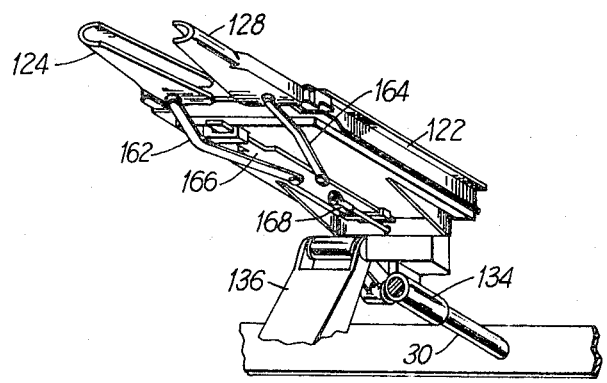
FIG. 7 is a perspective view of the mechanism shown in FIGS. 4 and 5, looking from the bottom front of the apparatus.

Scoop members 124 and 128 are pivotable inwardly from the position shown in FIG. 5 during the forward stroke of carriage 132 to present a narrower leading edge so as to be readily insertable into the topmost bag of bag supply means 32. When the scoops have been inserted into a bag, they are pivoted outwardly to the position shown in FIG. 5 whereat they firmly grasp the inside of the bag by a frictional engagement, and are operable to withdraw the bag from the supply and hold it during the rearward stroke of carriage 132.

With reference to FIGS. 4—7, the mechanism for pivoting the scoops inwardly includes two shaped links 162 and 164, connected to the bottom rear portions of scoop members 124 and 128 respectively. The rearward ends of links 162 and 164 are connected to an actuating member 166 slideably mounted to the bottom of tray member 118. An actuating rod 168 is connected to actuating member 166 and is operable, in a manner set forth below, to draw the actuating member rearwardly, which will cause links 162 and 164 to pivot scoops 124 and 128 inwardly.

Actuating rod 168 is pivotally connected, at 170, to one end of a rod 172. The other end of rod 172 is connected to the lower end of a link 174, the upper end of which is connected to a cylinder 176 rotatably mounted on a shaft 178. An arm 180 having a plurality of holes 182 is connected to cylinder 176. One end of an operating rod 184 is detachably mounted in one of the holes 182.

Referring in particular to FIGS. 4 and 5, a rocker member 186, having two arms 188 and 160 formed at right angles to each other is pivotally mounted to an extension of shaft 140. A similar rocker member 192, having two arms 194 and 196 formed at right angles to each other, is pivotally mounted to an extension of shaft 150.

The lower end of operating rod 184 is slidably received in a slot 198 in arm 188 of rocker member 186. Arm 190 of rocker member 186 and arm 196 of rocker member 192 are connected together by a link 200. The upper end of an operating link 202 is pivotally mounted to arm 194 of rocker member 192.

Referring again to FIG. 2, a rocker member 204 having two arms 206 and 208 formed at right angles to each other is pivotally mounted on shaft 154. The lower end of operating link 202 is pivotally mounted to arm 206 of rocker member 204.

A vertically extending member 209 is mounted to the floor of first-story housing 44. A bearing mounting member 210 is bolted to member 209 and includes a bearing housing 212 cantilevered from the free end thereof. A cam follower arm 214 is pivotally mounted, at the center thereof, to the bearing housing 212. One end of cam follower arm 214 includes a cam follower 216 riding on a cam 218 mounted on output shaft 54. The other end of cam follower arm 214 is pivotally connected to one end of a link 220, the other end of which is pivotally connected to arm 208 of rocker member 204. A clip 222 is also pivotally connected to rocker member arm 208, said clip mounting one end of a spring 224, the other end of which is attached to the frame at 226. This spring biases rocker member 204 in a counterclockwise direction and thus, through link 220 and the lower end of cam follower arm 214, keeps cam follower 216 in constant contact with cam 218.

The scoop pivoting mechanism operates generally as follows: when cam follower 216 rides down on the low portion of cam 218 (this will be during the forward stroke of carriage 132), cam follower arm will rotate in a clockwise direction, moving link 220 to the left as seen in FIG. 2. This rotates rocker member 204 in a counterclockwise direction, pulling operating link 202 downwardly, thus rotating rocker member 192 in a counterclockwise direction. This, through link 200, rotates rocker member 186 in a counterclockwise direction, driving operating rod 184 upwardly. This pivots arm 180 upwardly, pulling back link 174 and thus pulling back actuating rod 168 and actuating member 166 to cause an inward pivot of the scoops.

The angle of inward pivot of scoops 124 and 128 may be varied by mounting the upper end of operating rod 184 in different ones of the plurality of mounting holes 182 provided therefor in arm 180. As the connection between operating rod 184 and arm 180 is displaced away from the pivotal center of arm 180, the forward pivot of link 174 will increase, thus increasing the forward movement of actuating rod 168, and thus the inward pivot of scoops 124 and 128.

Infeed conveyor 26, the reciprocation of scoop-tray mechanism 28 on shaft 30 and the pivoting of scoop members 124 and 128 are operated in timed relationship from power train 24 by the arrangement of the angular attitude of the high and low points of cams 160 and 218 on output shaft 54 and the placement of crossbar pushers 74. During the forward stroke of scoop-tray mechanism, scoop members 124 and 128 are pivoted inwardly so as to easily enter the inflated topmost bag of supply 32. As the leading edge of tray 118 reaches a point opposite the end of infeed conveyor 26, a pusher bar 74 has delivered an article to the end of the infeed conveyor, which article, upon further movement of pusher bar 74, will be dropped into tray 118.

However, with reference to FIG. 3, it will be noted that the end of infeed conveyor 26 is displaced above and to the side of tray 118. At this interface, the unsupported article 230, if it is "soft" will droop or sag as the leading portion thereof comes off the support of deck 72. This may cause the article to be delivered to tray 118 askew, or folded over, or even to miss the tray completely and jam the machine.

Drop-transfer mechanism 36 is provided to eliminate this problem. Referring to FIGS. 9—12, the drop-transfer mechanism, which for clarity is not shown in FIGS. 1—3, is mounted to the frame over outfeed conveyor 40 by brackets 232 and includes a housing 234 having a tongue 236 slideably mounted therein on wheels 238. A plurality of guide wheels 239 are provided to assure rectilinear back and forth movement of tongue 236.

Tongue 236, which is generally of rectangular shape, has a lowered portion 240 at its front center as can be best seen in FIG. 12. A plurality of upwardly extending finger members 242 are mounted on lowered portion 240. Finger members 242 are mounted such that they are at a level just below the end of infeed conveyor 26. As shown in FIGS. 9 and 10, the members 242 are horizontally extending members mounted on the lowered portion 240 of the tongue 236 so as to extend upwardly therefrom. The tops of the members 242 define a platform on which an article may be seated.

Tongue 236 is driven from power train 24 off an extension of shaft 58. A first sprocket 244 is mounted on shaft 58. A second sprocket 246 is mounted above and in spaced relationship with chain mount 244 and a drive belt 248 is mounted between sprocket 244 and sprocket 246 to transmit the rotation of the former to the latter. Sprocket 244 is fixed to a shaft 250 which shaft is thus driven by chain 248 in a timed one-to-one relationship. A bevel gearbox 252 is connected to shaft 250 and in a well known manner translates the rotational direction of shaft 250 90° such that a shaft 254 connected at the other end of bevel gearbox 252 is rotated about a vertical axis rather than the horizontal axis of shaft 250. Shaft 254 extends upwardly through a housing 256 mounted on the side of the outfeed conveyor by a bracket 258.

An eccentric crankpin wheel and crank arm combination 260 is driven by shaft 254. More specifically, an eccentric crankpin wheel 262 is mounted at the upper end of shaft 254, above housing 256 and a crank arm 264 is pivotally mounted to the top of housing 256 at 266. A slot 268 is formed in crank arm 264 for receiving a driving pin 270 mounted in cam wheel 262. An operating rod 272 is pivotally connected at one end thereof to the free end of crank arm 264. The other end of operating rod 272 is pivotally connected to tongue 236 at 274.

In operation, shaft 254 rotates cam wheel 262 in a clockwise direction, pivoting crank arm 264 to the right as seen in FIG. 10. This causes operating rod 272 to drive tongue 236 to its extended position, immediately adjacent to the end of infeed conveyor 26, as shown in FIG 9.

It will be noted from FIG. 9 that when tongue 236 is extended, driving pin 270 is in its "lower" position on cam wheel 262. During the next increment of cam wheel rotation, driving pin 270 will travel in slot 268, and thus tongue 236 will remain in its extended position for that period of time to support an article being delivered off infeed conveyor 26. Due to the proximity of the end of tongue 236 to the end of the infeed conveyor, and the small difference in height therebetween, the articles coming off the infeed conveyor will not sag, droop, or fall down into the internal moving parts of the machine. When pin 270 reaches the end of slot 268, crank arm will be pivoted to the right as seen in FIG. 10, pulling tongue 236 rapidly away from underneath the article supported thereon. The rearward motion of tongue 236 is faster than the forward move thereof due to the arrangement of the linkages involved. This rapid removal of the support provided for the article by tongue 236 causes it to drop evenly into tray 118. A comb 276 is mounted in a spaced relationship with tongue 236 to preclude a very light article from being pulled backwardly by tongue 236 due to its frictional engagement therewith. Comb 276 is connected to housing 234 by pair of struts 278 and a bracket 280. A pair of adjustable pins 282 mounted in bracket 280 hold struts 278 to housing 234. The lateral position of comb 276 may be adjusted by unscrewing finger pins 282 and sliding struts 278 forwardly or backwardly. As best shown in FIG. 12, comb 276 comprises a crossmember 284 and a plurality of downwardly extending members 286 which are positioned between upwardly extending members 242 of tongue 236. Therefore, downwardly extending members 286 will engage the side of a very light article held on tongue 236 and prevent it from being drawn backwardly as the tongue retracts.

Blockade means 34 includes a blockade member 290 mounted over shaft 30 by a bracket 292 and a supporting member 294. The blockade member 290 is disposed in the path of travel of scoop-tray mechanism 28. Due to the open nature of the top of scoop-tray mechanism 28, it can pass through the blockade member 290 on the forward stroke of its reciprocating travel. The relationship of blockade 290 to the path of travel of the scoop-tray mechanism 28 can be seen in FIG. 3. The width of blockade member 290 is such that the scoop members cannot pass the blockade member when they are pivoted inwardly. Therefor, the scoops are pivoted inwardly by the action of cam follower 216 on cam 218 after they pass blockade 290. The blockade member, in cooperation with the rearward stroke of scoop-tray mechanism 28, effects the actual bagging operation. As stated above, on the forward stroke of scoop-tray mechanism 28 an article to be bagged is delivered to tray 118. At the end of the forward stroke of scoop-tray mechanism 28, scoops 124 and 128 engage a bag and hold it thereon.

When scoop tray mechanism 28 travels backwardly, blockade member 290 engages the rear of the article held in the tray and holds it stationary as the scoop-tray mechanism continues backwardly. In effect, the blockade member causes the article to "advance" towards the front of tray 118 and into scoop members 124 and 128. Scoop members 124 and 128 are shaped so they provide a support for the article now held by the bottoms thereof. At this time, the bag surrounds the article, since the bag is supported on the outside of the scoop members 124 and 128 and the article is supported by the insides of the scoop. Further rearward travel of scoop-tray mechanism 28 will cause the front of the article to engage the back of the bag. At this time the scoops may be contracted slightly to allow the blockade member to easily strip the bag from the scoops by pushing the article against the bottom of the bag.

As shown in FIG. 2, the bracket 292 is pivotally mounted to frame 20 at 295. It is strongly biased to its forward position by a spring 296. In case of a jam in the bagging operation effected conjointly by blockade member 290 and scoop-tray mechanism 28, a blockade member 290 will be pushed backwardly pivoting the portion of bracket 292 below pivotal mount 295 forwardly. A normally closed microswitch 297 is mounted in the path of travel of the lower portion of bracket 292 and will be actuated in the case of a jam. Microswitch 297 is connected to brake-clutch unit 64 and will stop the machine upon the actuation thereof.

As shown in FIG. 4, a vertically extending member 298 is provided on the upper surface of each scoop to provide a channel for air to escape through when the blockade member 290 inserts the article in the bag.

At this point, the bagged article will be unsupported, and since the bag is essentially of a filmy nature, being made of polyethylene or the like, the bagged article is again susceptible to sagging or deforming as it drops to the substantial distance to outfeed conveyor 40. This difference in height between scoop-tray mechanism 28 and outfeed conveyor 40 can readily be ascertained by viewing FIG. 3.

Elevator mechanism 38 is provided to support the bagged article in its travel between the level of scoop-tray mechanism 28 and the level of outfeed conveyor 40. With reference to FIGS. 2 and 8, elevator mechanism 38 comprises a platform 302 which includes a plurality of finger-shaped members 304 having spaces 306 therebetween. Fingers 304 are operable to support bagged articles thereon. A support strut 308 is connected to each finger 304 the struts being connected at their lower ends by a crossmember 310.

Elevator mechanism 38 is mounted for an oscillating up and down movement by a linkage mechanism, generally designated 312, which is connected between the elevator mechanism and power train 24.

Linkage mechanism 312 includes a pair of spaced oscillating links, 314 and 316, one connected to each of the outside struts 308 slightly below the midportions thereof. The other ends of oscillating links 314 and 316 are mounted to a shaft 318 mounted between the sides of the rear portion of the outfeed conveyor housing 319. Crossmember 310 is pivotally connected to a link 320, the other end of which is mounted in a slot 322 at one end of a link 324. Link 324 is mounted on a shaft 326 which is rotatably mounted between the sidewalls of the frame 20. The other end of link 324 includes an aperture 327 to which one end of a spring 328 is connected. The other end of spring 328 is mounted to a bracket 330 connected to frame 20. The effect of spring 324 is to bias the pivotal movement of link 324 about shaft 326 in a counterclockwise direction as viewed in FIG. 3, thus biasing platform 302 to its upward position.

The platform 302 is cycled downwardly by rotation of shaft 326 in a clockwise direction. This is effected by an upward drive of an operating rod 332, the upper end of which is connected to link 324 between the connections thereof to shaft 326 and spring 328. The lower end of operating rod 332 is connected to a lug 334 on a cam follower 336. Cam follower 336 is pivotally mounted to a shaft 338 mounted between vertically extending support members 340 and 342 and frame 20. Cam follower 336 rides on a cam 344 mounted on output shaft 54 of power train 24. Cam follower 336 is kept in engagement with cam 344 by the force of spring 328. When the cam follower is lifted by riding up on the high-shaped portion of cam 344, operating rod 332 is driven upwardly, pivoting link 324 in a clockwise direction as viewed in FIG. 3. This pulls platform 302 downwardly from its highest position, corresponding to the lowest portion of cam 344, which is just below scoop-tray mechanism 28. When cam follower 336 reaches the highest portion of cam 344, platform 302 will be down below the level of outfeed conveyor 40 and the bagged article will be transported away therefrom by the conveyor as will be described in detail hereinbelow. Cam 344 provides a dwell period at the bottom of the cycle of platform 302 to allow sufficient time for the bagged article to be pulled away therefrom by outfeed conveyor 40 before its starts upward movement to its position just below scoop-tray mechanism 28. Slot 322 is provided to change the length of the stroke of the elevator mechanism when desired.

Elevator mechanism 38 is cycled in timed relationship with scoop-tray mechanism 28 by the arrangement of the angular attitude of the high and low portions of cam 344. In operation, platform 302 is in its highest position, just as the bagged article is being stripped therefrom.

Outfeed conveyor 40 comprises (FIGS. 1 and 3) a housing 346 in which are mounted two rotatable idler shafts 318 and 348 and a driven shaft 350. Five belt mounts 352 are mounted in spaced relationship on shafts 318, 348 and 350 are five endless belts 354 are mounted thereabout from support members 356 are mounted between the upper passes of belts 354 to provide more of a support for the bagged articles being transported thereon. Support members 356 are in alignment with elevator fingers 304, while belts 354 are in alignment with spaces 306. The leading edges of the upper passes of belts 354 are adjacent the backs of spaces 306, as seen in FIG. 1.

When elevator mechanism 38 is cycled downwardly with a bagged article thereon, when platform 302 drops below the level of belts 354 the belts 354 will engage the bagged article and drive it to the left as seen in FIG. 1.

Belts 354 are kept taut by biasing shaft 348 to the right as seen in FIG. 3. This is effected by a spring 358 which is mounted to a pivotal link 360 mounted between shaft 348 and a shaft 362 pivotally mounted to a bracker 364.

Outfeed conveyor 40 is driven from power train 24 through a pulley 366 mounted on shaft 350, a pulley 367 and a sprocket gear 368 mounted on shaft 326 and a sprocket gear 370 mounted on output shaft 60. An endless chain 374 transmits the rotational power of shaft 60 to shaft 326 through sprockets 370 and 368, and belt 375 transmits the rotation of shaft 326 to shaft 350 through pulleys 366 and 367.

Bag supply subcombination 32 is set forth in detail in the assignee's copending application, Ser. No. 620,387. Broadly speaking, the bag supply apparatus includes a support 376 on which a plurality of bag supply trays 378 are detachably mounted. Means 380 are provided to lock a tray 378 in a position in axial alignment with scoop-tray mechanism 28 and a vertical position such that the top bag in the tray 378, when inflated by a blast of air provided by the direction of compressed air at the topmost bag in tray 378 through a nozzle 382 connected through a solenoid valve 383 by conventional means to a house supply. The means for keeping the topmost bag of the stack in tray 378 at a constant level as bags are removed by scoop-tray mechanism 28 is disclosed in said copending application, Ser. No. 620,387, as is the means for switching trays when the bags in one are exhausted. A switch 384 is mounted to support 376 and includes a pivotally mounted actuating member 386 extending over the tray 378 so as to engage an inflated bag. This is part of the machine control circuit, described hereinbelow to change the operation of the machine if certain conditions are not met. One of these is a noninflated bag, which is sensed by actuating member 386 of switch 384. A plate 387 is mounted over the tray 378 in position 379 to shape the opening of the inflated bag. This plate may be sized and positioned to provide the most advantageous shape of bag opening for the particular article being bagged.

Referring now to FIG. 13, a control circuit 388 for the machine comprises a start switch 390 for energizing a motor starter 392 for connecting drive motor 22 to a transformer 394 connected to a house source. A lamp 396 is lit when the motor is running. Brake-clutch unit is operated by a relay 398 controlled jointly by normally open inflated bag switch 384, a normally closed cam switch 384, normally closed cam switch 400 (FIG. 3) mounted on output shaft 58 and temporarily opened at the end of each bagging cycle, when scoop-tray mechanism 28 is in its rearmost position and normally closed pole 814 of article sensing switch 82 on infeed conveyor deck 74. Solenoid valve 383 must be energized before it will be supplied to bag inflating nozzle 382. The other pole 86 of article sensing switch 82, which is normally open, controls solenoid valve 383. A normally operated button jog switch 406 is provided to test the arm supply by energizing solenoid valve 383. However, as soon as pressure is released from button jug switch 406, the solenoid valve will be deenergized. A similar jog switch 408 is provided for jogging motor 22 to operate the machine for a portion of the cycle thereof. A switch 410 is provided for stopping the operation of motor 22.

Control circuit 388 functions to prevent the inflation of a bag by nozzle 382 when there is no article ready to be delivered to drop transfer mechanism 36 and scoop mechanism 28 from the end of infeed conveyor 26. This absence of an article at that point is sensed by actuating member 80 of switch 82 and pole 86 will remain open, keeping solenoid valve 383 deactivated. However, the brake clutch unit is still activated and the rest of the machine will cycle.

The control circuit also operates to stop the machine if there is an article to be bagged over actuating member 80 of switch 82 and no inflated bag sensed by switch 384. The machine is stopped at that point in the cycle when scoop-tray mechanism 28 is at its rearmost position since at that point cam operated switch 400 will open, pole 84 of switch 82 will be opened by the presence of an article thereover, and switch 384 will be opened by the lack of an inflated bag to be sensed by actuating member 386. Thus solenoid 398 will be deenergized and the clutch of the clutch-brake unit will be disengaged and the brake applied. Correction of the condition that caused the noninflated bag will energize solenoid 398, releasing the brake and engaging the clutch to restart the machine cycle.

As stated above, bagging machine 18 is adapted for bagging soft, nonrigid, saggable articles. Exemplary of this type of article are sheets, pillowcases, towels, table cloths and the like, although the machine is not limited to bagging only these types of articles. The machine is designed to provide supports for articles being bagged at all points during the machine cycle so that articles having tendencies to droop, sag or the like will not deform so as to be improperly presented to any of the subcombinations of the bagging machine or to fall past one of the operating mechanisms to foul one or more of the working parts of the machine.

The machine can be positioned so that infeed conveyor 26 is positioned to receive articles from a previous operation and outfeed conveyor 40 feeds into a bag sealing machine.

We claim:

1. In a bagging machine adapted to be provided with a supply of bags and including an infeed conveyor for articles to be bagged, and an outfeed conveyor for bagged articles, apparatus which comprises:

a bagging mechanism including a tray for receiving an article to be bagged and scoop means connected to the forward end of the tray, the mechanism being mounted for reciprocal movement to and from the bag supply, the scoop means moving past the infeed conveyor whereat it is operable to remove a bag from the bag supply and the tray is disposed to receive the article, and the scoop means moving past the outfeed conveyor to bag the article and whereat the bagged article is removable from the bagging mechanism;

means for removing the bagged article from the bagging mechanism;

reciprocating means for temporarily vertically supporting and positioning an article coming off the infeed conveyor preparatory to its delivery to the bagging mechanism including a member mounted for reciprocal movement past the path of reciprocal movement of the bagging mechanism, means for driving said member forwardly to a position whereat the leading edge thereof is adjacent the end of the infeed conveyor thereat to receive the article therefrom; means for delivering the article to the bagging mechanism;

elevator means for receiving the bagged article removed from the bagging mechanism and transporting it to the outfeed conveyor, said elevator means including an article lowering platform for supporting the article while it is being transported to the outfeed conveyor; and means for timing the movement of the bagging mechanism and reciprocating means and elevator means.

2. Apparatus according to claim 1, wherein:

said supporting and positioning means further comprises a stationary member mounted adjacent the path of travel of said reciprocal member; and said driving means is operable to drive said reciprocal member backwardly away from said infeed conveyor, whereupon said stationary member engages the article supported thereon and stops the movement thereof as the reciprocal member continues to be driven backwardly, causing the removal of the article therefrom.

3. Apparatus according to claim 2, wherein:

the timing means includes the driving means for the reciprocal member which is operated in a timed relationship with the reciprocation of the bagging mechanism such that an article removed from the former is receivable in the latter as it moves therepast.

4. Apparatus according to claim 2 wherein:

said bagging machine includes a supply of bags mounted adjacent said bagging mechanism; and said scoop means is a means for engaging a bag of said bag supply, removing it therefrom, and holding it as the bagging mechanism moves away from said bag supply.

5. Apparatus according to claim 4, wherein:

the driving means for the reciprocal member of the article supporting and positioning means is operated in a timed relationship with the reciprocation of the bagging mechanism such that an article removed from the former is receivable in the tray of the bagging mechanism.

6. Apparatus according to claim 1, wherein:

said bagged article receiving means includes a platform mounted for movement between a first position whereat it is adjacent the path of travel of the bagging mechanism and a second position whereat it is positioned to deliver a bagged article to the outfeed conveyor; and said timing means includes means for moving said platform in a timed relationship with said bagging mechanism such that the platform is in its first position when a bagged article is removed from the bagging mechanism.

7. Apparatus according to claim 1, wherein:

said reciprocal member includes a recessed portion at the leading edge thereof, and a plurality of spaced vertically extending article engaging members mounted in said recessed portion.

8. Apparatus according to claim 7, wherein:

said article supporting and positioning means further comprises a stationary member mounted adjacent the path of travel of said reciprocal member and including a plurality of downwardly extending fingers mounted in spaced relationship with the spaces between said vertically extending article engaging members; and said driving means is also operable to drive said reciprocal member backwardly away from said infeed conveyor, whereupon said fingers of said stationary member engage the article supported on the vertically extending article engaging members of the reciprocal member and stops the movement thereof as the reciprocal member continues to be driven backwardly away from the infeed conveyor, causing the removal of the article therefrom.

9. Apparatus for bagging articles, which comprises:

an infeed conveyor for delivering articles to a first transfer position;

an outfeed conveyor;

a bagging mechanism mounted for reciprocal movement past said infeed and outfeed conveyors, said bagging mechanism including means for receiving articles thereon;

means mounted adjacent said infeed conveyor for supporting and positioning articles at said first transfer position;

means for driving said article supporting and positioning means to and from the first transfer position;

means for removing said article from said supporting and positioning means when the last named means is driven away from said first transfer position;

means for operating said infeed conveyor, said bagging mechanism and said article supporting and positioning means in a timed relationship such that the article supporting and positioning means is positioned at the transfer position to receive an article delivered thereto by the infeed conveyor and is driven away from the infeed conveyor to remove the article therefrom when the bagging mechanism is at said first transfer portion, the article being then receivable in the bagging mechanism article receiving means;

means for removing bagged articles from the bagging mechanism at a second transfer position; and means for engaging a bagged article at the second transfer position and transporting it to said outfeed conveyor.

10. Apparatus according to claim 9 wherein:

said outfeed conveyor comprises a plurality of spaced driven belts;

said bagged article engaging means includes a platform including a plurality of finger elements, in spaced relationship with the spaces in the outfeed conveyor belts said platform mounted for movement between a first position whereat it is adjacent the path of travel of the bagging mechanism and a second position whereat the fingers of the platform are below and between the belts of the outfeed conveyor the belts then being operable to carry away the bagged article; and means for moving said platform in a timed relationship with said bagging mechanism such that the platform is in its first position when a bagged article is removed from the bagging mechanism.